C. E. WHITE.
FEEDING BASKET FOR BIRDS.
APPLICATION FILED NOV. 22, 1913.
1,092,314.
Patented Apr. 7, 1914.
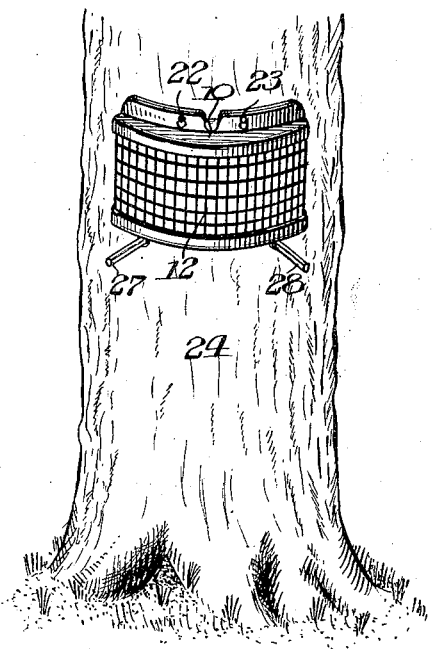
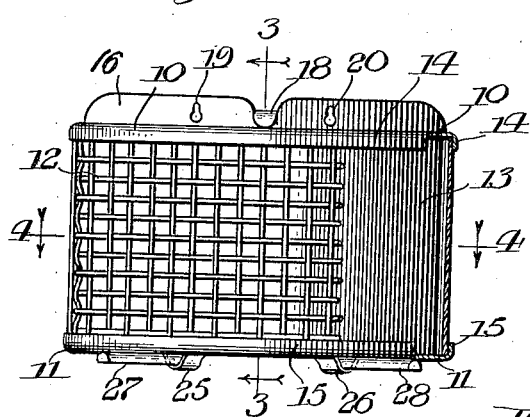
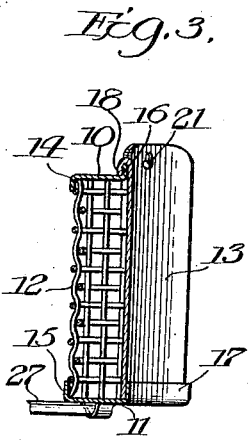
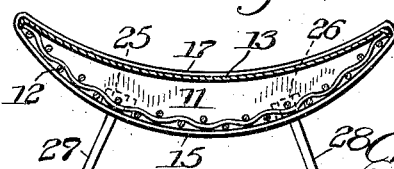
Inventor
Charles E. White

UNITED STATES PATENT OFFICE.

CHARLES E. WHITE, OF WILMETTE, ILLINOIS.

FEEDING-BASKET FOR BIRDS.

1,092,314.

Specification of Letters Patent.

Patented Apr. 7, 1914.

Application filed November 22, 1913. Serial No. 802,395.

*To all whom it may concern:*

Be it known that I, CHARLES E. WHITE, a citizen of the United States, and resident of Wilmette, county of Cook, and State of Illinois, have invented certain new and useful Improvements in Feeding-Baskets for Birds, of which the following is a specification, and which are illustrated in the accompanying drawings, forming a part thereof.

The object of the invention is to provide means for supplying food to wild birds and it consists of a basket having a reticulated front and adapted to be attached to a suitable support such as a tree, other details of the invention being hereinafter pointed out.

In the accompanying drawings, Figure 1 shows the device in elevation and as mounted upon the trunk of a tree; Fig. 2 is a front elevation of the device, some of the parts being broken away; Fig. 3 is a sectional view on the line 3—3 of Fig. 2; Fig. 4 is a sectional view on the line 4—4 of Fig. 2.

The basket comprises top and bottom crescent shaped plates 10, 11, preferably formed of sheet metal; a reticulated front member, 12, permanently attached to the outer edges of the top and bottom plates; and a removable back plate 13, preferably of sheet metal. The top plate 10 is preferably provided with a down turned flange 14 to cover the upper margin of the front 12, and the bottom plate 11 is preferably provided at its front edge with an upturned flange 15 covering the lower margin of the front. At their rearward edges the plates 10, 11 have upstanding flanges 16, 17. The back plate 13 fits within the flange 17 and is provided with an over turned lip 18, which hooks over the flange, 16, the latter being preferably recessed as shown, for its accommodation. Apertures 19, 20, formed in the flanges 16 register with apertures 21 (only one of which is shown in the drawings) in the plate 13, these apertures being adapted to receive studs, hoops or screws, as 22, 23, fixed in the support, such as the tree trunk 24, and which serve not only to support the basket but also to prevent the accidental displacement of the back plate 13. Loops 25, 26 may be formed upon the lower face of the bottom plate 11, to carry perches 27, 28 upon which the birds may stand in feeding.

The basket is intended to contain any material which may be used as bird food, such as suet and the bird will feed thereupon while resting upon the perches, or clinging directly to the reticulated front member. The crescent form of the basket is essential only when it is intended to be hung upon the trunk of a tree.

The basket is opened for filling by removing it from its support whereupon the back plate may be lifted out of place and again restored after the feed has been packed within the chamber of the basket. The device being again hung in position for service it remains intact until again taken down.

The perches 27, 28 are preferably of wood and while rounded above have their lower faces flattened in order that they may be more securely gripped by the claws of the bird.

I claim as my invention,—

1. A feeding basket for birds comprising, in combination, top and bottom plates, the top plate having an upstanding flange, an apertured front member and a back plate interfitting with the bottom plate, the top and back plates having registering apertures for receiving a supporting pin.

2. A feeding basket for birds comprising, in combination, top and bottom plates, the top plate having an upstanding flange, an apertured front member and a back plate interfitting with the bottom plate and having an overturned lip for engaging the top plate, the top and back plates having registering apertures for receiving a supporting pin.

3. A feeding basket for birds comprising, in combination, top and bottom plates each having an upstanding flange at its rear margin, an apertured front member, and a back plate fitting within the flange of the bottom plate and having an overturned lip for engaging the flange of the top plate, the back plate and top plate flange having registering apertures for receiving a supporting pin.

4. A feeding basket for birds comprising, in combination, top and bottom plates each having an upstanding flange at its rear margin, an apertured front member, and a back plate fitting within the flange of the bottom plate and having an over-turned lip for engaging the flange of the top plate, the back plate and top plate flange having registering apertures for receiving a supporting pin and forwardly projecting perches.

CHARLES E. WHITE.

Witnesses:
 OTTO M. WERMICH,
 E. M. KLATCHER.